3,717,400
MICROFORM VIEWER LENS FOCUSING MECHANISM

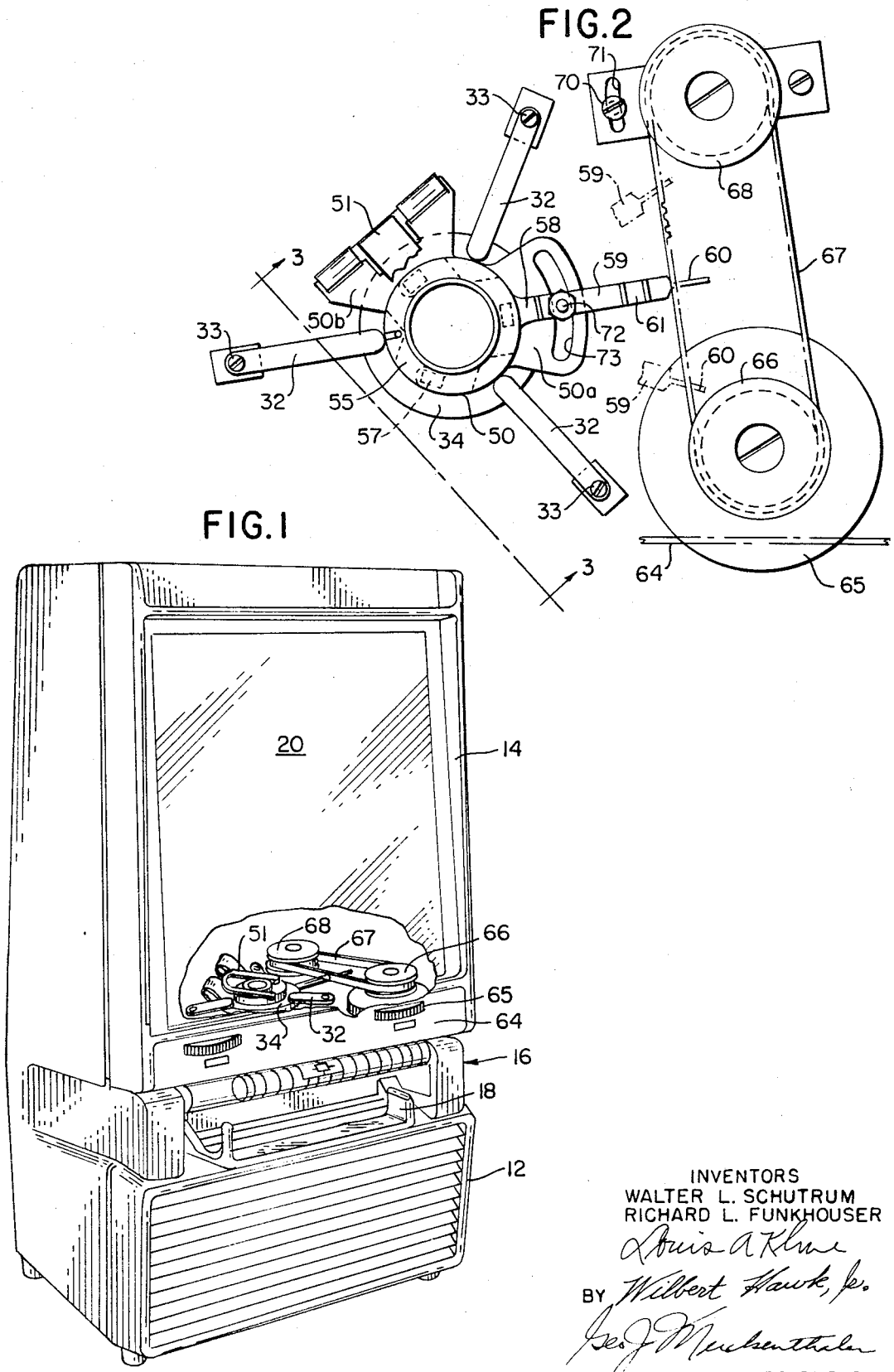

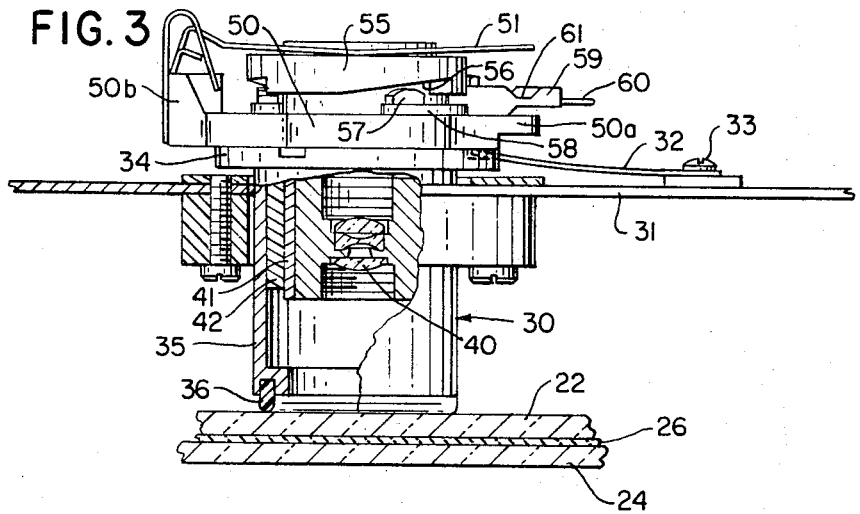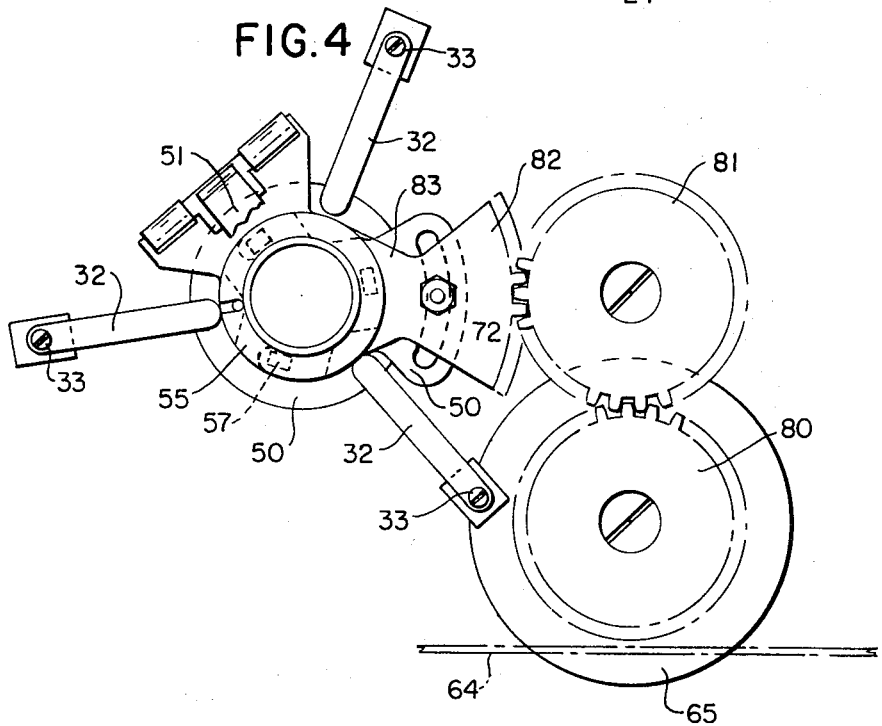

Walter L. Schutrum and Richard L. Funkhouser, Kettering, Ohio, assignors to The National Cash Register Company, Dayton, Ohio
Filed Feb. 25, 1971, Ser. No. 118,818
Int. Cl. G02b 7/02
U.S. Cl. 350—255        3 Claims

ABSTRACT OF THE DISCLOSURE

An operator-controlled lens focusing arrangement for a microform viewer wherein a belt is carried around two pulleys, one of the pulleys being integral with the operators control knob, a lens holder is supported by tracking mechanism which is in contact with the glass cover plate for the microform, and a camming ring is secured to the lens holder for the purpose of maintaining the lens in focus by vertical movement thereof. A camming yoke having a pin secured thereto extends toward the belt, the pin penetrating the belt and the yoke being swingable along a horizontal plane in response to travel of the belt which causes the camming ring to raise or lower the lens holder and to place the lens in proper focus. Different lenses may be interchanged under this arrangement with minimum adjustment for proper focus.

BACKGROUND OF THE INVENTION

As is well known, the microform viewer or reader is becoming a necessary item of equipment in the business field to enable rapid accessibility to information which is stored in the nature of images on microform sheets or strips, commonly called microfiche or microfilm. A sheet of microfiche contains the equivalent of many pages of information so it is very important to retrieve certain desired information as quickly as possible. As is also well known, the reduction ratio of microform readers may vary, e.g. from 15 to 150 times, and also the ratio of the microform may vary. Because of these variances, it becomes advisable to have available a number of lenses of different values rather than a plurality of readers with different reduction ratios. In other words, it is much simpler and more economical to have several lenses which are usable in one reader rather than several readers each with its individual identifying lens.

The use of different magnification lenses in a specific reader, of course, presents a problem of maintaining focus when the lenses are interchanged to accommodate a microform of like ratio. While it is a simple matter to provide apparatus which accepts different lenses, it is important to have mechanism which, with minimum adjustment, provides for maintaining the selected information image in proper focus. It is to such mechanism that the present invention is directed.

SUMMARY OF THE INVENTION

The present invention relates to microform readers and more particularly to a lens focusing mechanism for accommodating different lenses in a specific reader. The mechanism includes a belt carried around a pair of pulleys within the reader, one of the pulleys being integral with a lens focusing knob extending through the front of the reader and easily accessible to the operator. The lens is supported from a holder, in turn, carried by tracking mechanism which contacts the cover glass plate of the microform carrier. A camming ring is positioned around the lens holder and secured thereto for the purpose of presenting and maintaining the lens in focus, and a camming member in the form of a yoke or arm extends toward the belt and is connected thereto. The belt has an aperture therein for receipt of a pin which is secured to the camming yoke, and the camming yoke has a plurality of projecting elements engageable with inclined surfaces on the camming ring which is located at the top of the lens holder.

The tracking mechanism is biased against the glass plate by means of leaf springs and the lens holder is retained in a tracking sleeve of such mechanism by means of a spring loaded arm to insure continuous contact between the camming ring inclined surfaces and their cooperating yoke projecting elements. Movement of the belt by means of the lens focus knob thereby swings the camming yoke to vertically move the lens holder to the desired position to maintain proper focus. Whenever it becomes necessary to change lenses, the spring loaded arm is released and the lens holder is lifted from the tracking mechanism, whereupon the desired lens is placed into the sleeve and after which the spring arm is moved back into position on the lens holder. A guide pin is secured to the tracking sleeve and mates with a cooperating slot in the lens holder to properly guide and position the parts. A viewing of the reader screen then determines the amount of fine focusing required and the focus knob is rotated which, in turn, moves the belt and the connected camming yoke is rotated with its projecting elements moving along the inclined surfaces to raise or lower the lens holder and thus attain proper focus.

An alternate arrangement of lens focus control utilizes a formation of gears in place of the belt and pulleys between the control knob and the camming structure.

In accordance with the above discussion, the principal object of the present invention is to provide a microform reader with simple and economical lens changing characteristics.

Another object of the present invention is to provide mechanism for substantially maintaining focus in a microform reader upon each interchanging of the lens.

An additional object of the present invention is to provide apparatus having an infinite number of adjustments within the range of lens focusing.

A further object of the present invention is to provide apparatus for proper lens focusing of different lenses in a specific reader.

Additional advantages and features of the present invention will become apparent and fully understood from the following description taken together with the annexed drawings, in which:

FIG. 1 is a front perspective view of a microform reader incorporating the structure of the present invention;

FIG. 2 is a top plan view of one arrangement of the lens focusing mechanism;

FIG. 3 is a view taken along the line 3—3 of FIG. 2; and

FIG. 4 is a top plan view of a modification of the lens focusing mechanism.

Referring to the drawings, a reader or viewer of the type embodying the structure of the present invention is shown in FIG. 1 and includes a lower portion 12 and and upper portion 14, these portions being formed to provide an enclosure for the operating parts of a microform-type projection reader. A microform (or transparency) carrier assembly, designated as 16, includes a framework with an operating handle 18 attached thereto, the handle being used for moving the microform carrier into various positions for selecting one or another image on the microform to be viewed on a screen 20. Common to readers of this type are an upper 22 and a lower 24 transparent plate (FIG. 3) containing a microform card or sheet 26 therebetween, the upper plate 22 being pivotable to allow for insertion or removal of the microform card.

The microform carrier assembly 16 is movable as a unit in a side-to-side direction for the purpose of positioning a selected image on the card 26 over a projection lamp (not shown). Additional details of the microform carrier (not a part of the present invention) are shown in a copending application of T. A. Kyle and W. L. Schutrum, which application is assigned to the same assignee as the application of the present invention. Suffice it to say that the transparent plates 22 and 24 contain the microform 26 therebetween in an even or smooth condition to permit a projection lens in an assembly 30 to see the selected image and to pick up the image in a flat plane, so as to present a clear projection of the image on the screen 20.

The projection lens assembly 30 (FIG. 3) is carried on a panel 31 and is substantially supported therefrom by means of a plurality of leaf springs 32 equally spaced and fixed at one end to the panel by screws 33 so as to maintain the lens assembly 30 in position and to prevent rotation thereof. The other end of each spring 32 is seated in a matching recess in a collar portion 34 of a tracking sleeve 35, which sleeve extends downwardly through an opening in the panel 31, the leaf springs urging the tracking sleeve in a downward direction. Secured to the tracking sleeve 35, at its lower periphery, is a lens tracking ring 36, which ring is maintained in contact with and which glides over the top surface of the upper transparent plate 22 as the microform carrier assembly 16 is moved about during the selection of an image to be viewed. A projection lens 40 is enclosed and held within an inner sleeve or holder 41 carried in a lens sleeve 42 slidable up and down in the tracking sleeve 35. Although shown as being separate elements, holder 41 and sleeve 42 could be combined into one piece for containing the lens 40.

The present invention provides for ease of interchangeability of the projection lens 40 and its holder 41 whenever it is desired to use the reader for viewing a microform of a different reduction ratio. An upper support structure 50 is secured atop the collar portion 34 as an integral part of the tracking sleeve 35, the support structure 50 including a spring-loaded bifurcated member 51 attached thereto at one side thereof (see also FIG. 1) which member urges the lens holder 41 in a downward direction to maintain the lens plane in a precise position relative to the plane of the microform, the relationship of these planes being instrumental and important in maintaining the correct focal length of the lens 40. The support structure 50 has a central portion of similar diameters as the tracking sleeve 35 from which portion extend a support 50a to one side, and a support 50b to the other side for the bifurcated member 51. Secured to the lens holder 41, at the top thereof, is an adapter or camming ring 55 which has a flat upper surface for bearing thereagainst by the bifurcated spring member 51. The underside of the ring 55 has three equally spaced cutouts defining inclined surfaces 56 thereon for engagement by lugs or pads 57 of a cam yoke or focus arm 58 partially surrounding the lens holder 41 (see FIG. 3) and extending to one side thereof with an arm portion 59 carrying an outer pin 60 operably engaging with an adjacent belt member 67 (FIG. 2). The arm portion 59 is appropriately reduced in cross-sectional area at 61 so as to allow for complete freedom of up and down movement of the lens holder 41 and its associated parts.

Spaced from and positioned to the right of the lens assembly 30 is an operator's focus wheel 65, protruding through a reader frontal portion 64 (FIGS. 1 and 2), having a pulley 66 secured thereto by suitable means, the pulley carrying the timing belt 67, in turn, trained around an adjusting or idler pulley 68 carried on a support plate 69 rearward of such first pulley 66. The pin 60 engages an aperture within the belt 67 at a location between the pulleys 66, 68 and is capable of travel a limited arcuate distance, as seen by the dotted line positions of the arm 59 and pin 60 in FIG. 2. As further seen in FIG. 2, pulley 68 is adjustable in its distance from pulley 66 by means of the screw 70 slidable in the pulley support plate slot 71, while travel of the cam yoke 58 in relation to a preferred "start" position of the pin 60 by belt 67 is accomplished by means of a screw 72 slidably contained within a slot 73 in the support portion 50a. The support 50 remains stationary and does not rotate, while the cam yoke 58, through swinging of its arm portion 59, likewise swings with each movement of the timing belt 67. It is thus seen that rotation of the focus wheel 65 in one or the other direction causes movement of the belt 67 around the pulleys 66, 68 and swings the arm 59 in the limited path, which, in turn, causes movement of the lugs 57 of the cam yoke 58 (FIG. 3) along the inclined surfaces 56 of the camming or adapter ring 55.

In the operation of the mechanism, the spring-loaded bifurcated member 51 is swung upwardly to the left and a selected lens 40 and holder 41 with its adapter ring 55 secured thereto is placed into position within the tracking sleeve 35, whereupon the member 51 is then returned downwardly against the adapter ring 55 to retain the lens and holder in contact with the cam yoke 58. Since the selected lens theoretically corresponds to the reduction ratio of the microform 26 inserted between the transparent plates 22 and 24, a quick viewing of the screen 20 indicates whether or not the projected image is in focus. If the image is not in focus, the wheel 65 is turned slightly in the desired direction which, through the arm 59, pin 60 and belt 67 arrangement, moves the cam yoke 58 to move the lugs 57 thereof along the inclined surfaces 56 of the adapter ring 55 and by reason of the force of spring member 51 on the adapter ring 55, vertically moves the plane of the lens in relation to the plane of the microform image to obtain proper focus.

Since the focus arm 58 yoke extends 270 degrees around the lens holder, movement of the focus arm portion 59 moves the equally spaced lugs or pads 57 along the inclined surfaces of the lens holder adapter ring, the focus arm pivoting in a horizontal plane which is perpendicular to the optical axis, and such pivotal movement of the focus arm in relation to the non-rotatable lens holder causing vertical movement of the lens and holder to obtain proper focus. The pin-and-slot connection between the support portion 50 and the lens holder thus prevents rotation of the lens holder but allows the holder to freely move in the vertical direction. It is seen that the rate of change of focus for various lenses used with the lens assembly can be made constant for a given angular movement of the focus arm by establishing the appropriate angle of inclination of the surfaces for each lens and thus permit the operator to move the control knob the same distance for selected lenses.

A second embodiment of the invention is shown in FIG. 4 wherein the focus wheel 65 has secured thereto a gear 80 meshing with a second gear 81, in turn meshing with the toothed or gear segment portion 82 of a cam yoke 83. The remaining parts of the projection lens assembly are the same as described above. With this construction, rotation of the focus wheel 65 turns the gear 81 and moves portion 82 in an arcuate path to swing the yoke 83 and thereby raise or lower the lens holder 41 to obtain proper focus. It is understood, of course, that either the gear 81 or the toothed portion 82 must necessarily be of thicker stock material to allow for raising and lowering of the lens holder without losing the gear tooth meshing connection.

It is thus seen that herein shown and described is a lens focusing mechanism for a microform viewer which permits rapid interchangeablity of different lenses to correspond with a selected microform to be read, and which focusing mechanism is easily operable by the operator of the machine to obtain fine focus of the projected image on the screen. Additional advantages and features are realized in the particular construction wherein the operator can easily and quickly change lenses having different focal lengths and depths of focus, with minimum adjustment for each lens, by moving the focus control the same amount to attain the focal quality required. The inclusion of the adapter ring on the lens holder provides, by means of the inclined surfaces thereon, an angle of incline which varies for lenses of different depths of focus, so that movement of the lens holder is maintained vertical with the focal plane of the lens and which angle is relative to the total depth of focus of a given lens to which it is assigned. In this respect the incline of the surface is relative or proportional to the depth of a given lens and is designed to permit adjustment by moving the focus control the same amount for all types of applicable lenses in their range of focus regardess of the amount of focal depth of the selected lens. This feature permits the operation to move the focus control knob approximately the same amount for any lens used in the system regardless of its depth of focus to gain complete focal range for each selected lens. While only two embodiments have been disclosed, certain variations on the above may occur to those skilled in the art, so it is contemplated that all such variations having these features are within the scope of the invention.

What is claimed is:

1. Means for adjusting lens focus in a projection lens system having a lens holder, said means comprising
   an adjusting knob,
   drive means including a first pulley secured to the knob and operable in response to movement thereof,
   a second pulley spaced from the first pulley and an endless timing belt trained around the pulleys, yoke means including an arm extending from said lens holder and having a pin connected with the drive means endless belt and said yoke means positioned in contact with and partially surrounding said lens holder to actuate linear movement thereof upon pivotal movement of said yoke means, and
   camming means including a ring secured to the lens holder, said yoke means having spaced lugs thereon engageable with the ring for positioning the holder in response to rotation of the adjusting knob, the ring having inclined surfaces thereon for permitting infinite adjustments in the focusing of the lens.

2. The subject matter of claim 1 wherein the drive means comprises a first gear secured to and operated by the adjusting knob, a second gear meshing with the first gear and rotatable thereby, and said yoke means includes a gear segment portion meshing with said second gear for pivotal movement thereof upon rotation of said gears.

3. In a microform viewer having a projection lens system including a lens holder, a projection lens therein, and a source of light, means for focusing lenses of different depths of focus, the combination comprising
   a lens housing containing the lens holder for slidable movement thereof,
   camming means including a ring fixed to the lens holder and said ring having a plurality of inclined surfaces on one side thereof,
   yoke means including a pair of arms partially surrounding the lens holder and having lugs equally spaced thereon engageable with the inclined surfaces of the camming means for riding therealong for changing the vertical position of the lens holder in relation to the lens housing, and
   drive means including a first pulley and a second pulley, and a timing belt trained around said pulleys, said being connected to the yoke means for limited pivoting thereof upon movement of the belt so as to change vertical positioning of the lens holder to bring into focus the lens selected.

References Cited

UNITED STATES PATENTS

| 3,604,795 | 9/1971  | Crandall    | 353—76  |
| 3,134,298 | 5/1964  | Volkholz    | 353—101 |
| 2,908,209 | 10/1959 | Marvin et al. | 350—255 |
| 494,128   | 3/1893  | Decker      | 350—254 |

DAVID SCHONBERG, Primary Examiner

M. J. TOKAR, Assistant Examiner

U.S. Cl. X.R.

353—76, 101